H. B. KELLEY.
Green-Corn Cutters.

No. 150,244. Patented April 28, 1874.

WITNESSES.
A. Bennerendorf
Sedgwick

INVENTOR.
H. B. Kelley
BY
ATTORNEYS.

UNITED STATES PATENT OFFICE.

HENRY B. KELLEY, OF FOSTER'S CROSSING, OHIO.

IMPROVEMENT IN GREEN-CORN CUTTERS.

Specification forming part of Letters Patent No. 150,244, dated April 28, 1874; application filed February 7, 1874.

*To all whom it may concern:*

Be it known that I, HENRY B. KELLEY, of Foster's Crossing, in the county of Warren and State of Ohio, have invented a new and Improved Cutter for Removing Green Corn from the Cob, of which the following is a specification:

My invention consists of a series of three longitudinal concave knives, of different sizes in respect of their curves, arranged on a support, in combination with concave guides, to which the ears of corn, being held by a fork thrust into the butt of the cob, are presented endwise against the edges in succession, beginning with the knives having the largest curve, and passing onto the others in the order of their decreasing size, so as to divide the corn into two or more parts by the knives in advance of the hindmost one, and remove the remaining part from the cob by the last one, about a third or a quarter of the kernels being removed at one operation, and each ear being presented three or four times, and turned partly around each time.

Figure 1:
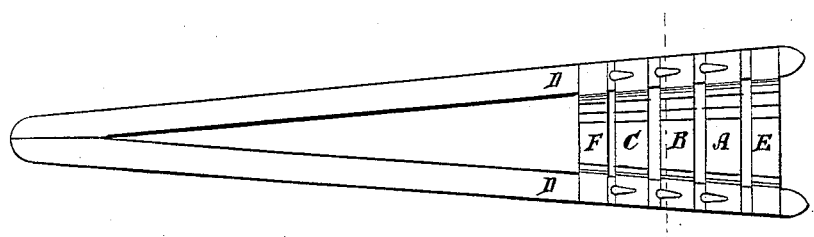
Figure 2:
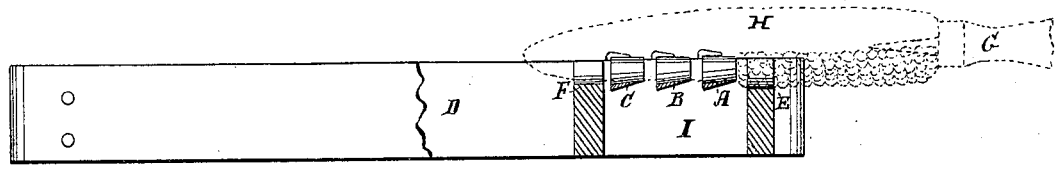
Figure 3:
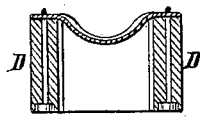

Figure 1 is a plan view of my improved cutter. Fig. 2 is a longitudinal sectional elevation of the cutter-support, and Fig. 3 is a transverse section on the line *x x* of Fig. 1.

Similar letters of reference indicate corresponding parts.

A, B, and C represent three cutters or knives, curved in their lengthwise direction on different radiuses, and arranged on a support, D, of any suitable form in succession, with short intervals of space between them. The first one, A, to which the corn is presented, is curved a little less than the average ears of corn to be cut, and in advance of it is a curved guide or rest, E, whose curve is as large as the ears, or a little larger. The curve of the middle cutter B is the medium between A and C, the latter being about the size of the cob when stripped of the corn. Behind C is another curved guide, F, about equal to it in size. The dotted lines G represent the fork by which the ears are held. It will, by preference, have but one tine or prong; but it may have more if found necessary. The dotted lines H represent the ear partly stripped of corn. A cutter of three blades will divide the kernels in three pieces. Two blades will answer if it is not desired to divide the kernels but once. The corn falls through the space I into a receptacle.

The corn is generally steamed and softened before cutting, the object being to facilitate the drying of it after cutting to be put up as dried green corn for market. The guides regulate the depth which the first and last blades cut.

Having thus described my invention, I claim as new and desire to secure by Letters Patent—

A corn-cutter consisting of the knives A B C, guides E F, and supports D D, constructed and arranged as and for the purpose specified.

HENRY B. KELLEY.

Witnesses:
C. SEDGWICK,
T. B. MOSHER.